(12) United States Patent
Van Aspert

(10) Patent No.: US 7,100,644 B2
(45) Date of Patent: Sep. 5, 2006

(54) FUEL CONTAINER

(75) Inventor: Joan Jozef Antonius Maria Van Aspert, Berlicum (NL)

(73) Assignee: Askove Kunststof Industries B.V., Al Veghel (NL)

( * ) Notice: Subject to any disclaimer, the term of this patent is extended or adjusted under 35 U.S.C. 154(b) by 0 days.

(21) Appl. No.: 10/848,504

(22) Filed: May 19, 2004

(65) Prior Publication Data
US 2005/0000595 A1    Jan. 6, 2005

(30) Foreign Application Priority Data
May 19, 2003   (NL) .................................. 1023469

(51) Int. Cl.
*B65B 1/04* (2006.01)
(52) U.S. Cl. ............................. 141/65; 141/98; 184/1.5
(58) Field of Classification Search .................. 141/65, 141/98, 7, 8, 351; 184/1.5
See application file for complete search history.

(56) References Cited

U.S. PATENT DOCUMENTS

| | | | |
|---|---|---|---|
| 3,055,217 A | | 9/1962 | Vogt |
| 5,117,876 A | * | 6/1992 | Kuntz .............................. 141/7 |
| 5,371,935 A | * | 12/1994 | Furs et al. .................. 29/426.2 |
| 5,878,799 A | * | 3/1999 | Hannick ...................... 141/351 |

FOREIGN PATENT DOCUMENTS

FR    2 794 437    12/2000

\* cited by examiner

*Primary Examiner*—Steven O. Douglas
(74) *Attorney, Agent, or Firm*—Foley & Lardner LLP

(57) ABSTRACT

The invention relates to a container for receiving fuel from a fuel outlet of an aircraft, which container comprises means of attachment for effecting a detachable, liquid-tight coupling with the fuel outlet. In the coupled condition, the container extends at least partially perpendicularly to the direction of outflow of the fuel from the fuel outlet of the aircraft. The invention furthermore provides a method for receiving and discharging fuel from a fuel outlet of an aircraft, comprising the steps of coupling a container for receiving fuel to a fuel outlet of an aircraft, draining the fuel outlet, disconnecting the container from the fuel outlet, and transporting the fuel in the container to a storage location for discharged fuel.

24 Claims, 1 Drawing Sheet

FUEL CONTAINER

BACKGROUND

The present invention relates to a container for receiving fuel from a fuel outlet of an aircraft, which container comprises means of attachment for effecting a detachable, liquid-tight coupling with the fuel outlet.

It is a known fact that some aircraft, such as the F-16, eject fuel via a fuel outlet after the aircraft engine has been turned off. The fuel outlet is positioned at the bottom of the aircraft and opens into the environment. To prevent fuel from the fuel outlet from falling onto the ground and finding its way into the environment, the ground crew places a receptacle on the ground under the fuel outlet of the aircraft before the engine of the aircraft is turned off. Subsequently, the ground crew signals to the pilot of the aircraft that he can turn off the engine of the aircraft. The fuel falls from the outlet into the receptacle, which is subsequently removed by the ground crew.

A drawback of this method is that there is a risk that not all the fuel will land in the receptacle and that fuel may be spilled on the ground. It is difficult for the ground crew to determine the correct position for the receptacle, in particular in situations in which the wind may blow the falling liquid away from the receptacle. Furthermore, the wind may blow away drops of fuel, even if the main jet of the fuel does fall into the receptacle. In addition, the unprotected and combustible fuel may be exposed to the environment while falling and while present in the receptacle. Furthermore, there is a risk of the ground crew unintentionally being soiled by aircraft fuel. In practice this often leads to the ground crew "forgetting" (i.e., intentionally failing) to place the receptacle under the aircraft, thus burdening the environment.

Furthermore, a container is known from U.S. Pat. No. 3,055,217, which discloses a device for receiving and containing liquid from a wing fuel tank of aircraft. In the coupled condition, the container is in line with the fuel outlet, which extends into the fuel tank with one end. To allow fuel to flow from the fuel tank into the container, the end extended into the fuel tank must be withdrawn to below the liquid level in the fuel tank.

A drawback of such a container is the fact that the container projects relatively far from the fuel outlet when the container is coupled to the fuel outlet. Moreover, in the case of combat aircraft, such as an F-16, a lack of space makes it very difficult (if not completely impossible) to couple the container to the fuel outlet when ammunition is present under the wings.

SUMMARY

An object of the invention is to provide a container for the fuel from the fuel outlet, which container, possibly in preferred embodiments of the invention, overcomes one or more of the aforementioned drawbacks in whole or at least in part and which can also be connected to the fuel outlet when ammunition is present under the wings in question. This object may be accomplished with the container according to the invention in that the container extends at least partially perpendicularly to the direction of outflow of the fuel from the fuel outlet of the aircraft when the container is coupled to the fuel outlet. By detachably coupling the container to the fuel outlet in a liquid-tight manner before the aircraft engine is turned off, the fuel flows directly from the fuel outlet into the container after the aircraft engine has been turned off. As a result, substantially no fuel will find its way into the environment. In addition, the risks involved in exposing the environment to fuel and of personnel being soiled with fuel are thus greatly reduced (if not completely eliminated).

The means of attachment preferably comprise a clamp coupling. The clamp coupling may be easy to connect, providing a liquid-tight seal, and may also be easy to disconnects after use.

In one embodiment according to the invention, the container is provided with an overflow. The overflow is preferably positioned so that it is located at the upper side of the container both in the coupled condition and in a vertically oriented condition. The overflow may function to release the pressure in the container that may otherwise increase during filling when a closed system is used, because the air that is present in the container can flow out freely. Another advantage of the presence of an overflow is the fact that, in the exceptional case when the container is not sufficiently emptied between uses, fuel can escape the container to greatly inhibit the likelihood that the container will become flooded. The positioning of the overflow ensures that fuel will only be injected into the environment through the overflow when the container is substantially or completely filled with fuel.

In another embodiment, the container may be provided with indicating means that are connected to the container. Moreover, the indicating means may be permanently (i.e., undetachably) connected to the container. The indicating means (e.g., a ribbon) may function to ensure that it will be clearly noticeable that such a container is connected to the aircraft. This may be done to minimize the risk of an aircraft taking off while a container is still connected to its fuel outlet.

In one preferred embodiment, the container may be mainly made of an antistatic material. Antistatic materials greatly reduce the likelihood of the container becoming statically charged, which might otherwise lead to sparking. It will be apparent that sparking should be avoided in the presence of a combustible liquid.

The container may be substantially made of a plastic material. Plastic is not only easy and economical to process, it makes it possible to reduce the weight of the container.

Another embodiment of the invention relates to a container for receiving fuel from a fuel outlet of an aircraft. This container includes, among other possible things: a reservoir; a clamp configured to engage a fuel outlet of an aircraft in a liquid-tight manner; and a coupling piece connecting the reservoir and the clamp. The coupling piece comprises a fuel flowpath. The fuel flowpath in the vicinity of the clamp is substantially vertical and in the vicinity of the reservoir is substantially non-vertical.

In a further embodiment of this container, the fuel flowpath in the vicinity of the reservoir may be substantially horizontal when the container is coupled to the fuel outlet of the aircraft.

In another further embodiment of this container, the container may also include an inlet. Moreover, the clamp may include, among other possible things: a rotatable union; a pressure ring configured to move, by means of a rotation of the union, substantially vertically upward and/or downward, when the container is engaged with the fuel outlet of the aircraft; and a rubber ring in contact with the pressure ring. The rubber ring may be configured to expand around the inlet, when the pressure ring is moved substantially vertically upward by the union. Further, the rubber ring may be provided below the inlet when the pressure ring is moved substantially vertically downward by the union.

In another further embodiment of this container, the container may also include an overflow outlet. Further, the overflow outlet may be positioned at an upper side of the container both when the container is coupled to the fuel outlet of the aircraft in a substantially horizontal orientation and when the container is not coupled to the fuel outlet and is in a substantially vertical orientation.

In another further embodiment of this container, the container may include an indicating means that is visible when the container is coupled to the fuel outlet of the aircraft. Further, the indicating means may be a ribbon.

In another further embodiment of this container, the container may be substantially made of an antistatic material and/or a plastic material.

The present invention also relates to a method for receiving and discharging fuel from a fuel outlet of an aircraft. This method includes, among other possible steps: (a) coupling a container according to the invention as previously described to a fuel outlet of an aircraft before the aircraft engine is turned off; (b) draining the fuel outlet: (c) disconnecting the container from the fuel outlet; and (d) transporting the fuel in the container to a storage location for discharged fuel.

By detachably coupling the container to the fuel outlet in a liquid-tight manner prior to turning off the aircraft engine, the fuel can directly flow from the fuel outlet into the container after the aircraft engine has been turned off. Once the fuel has drained into the container, the container can be disconnected from the fuel outlet in a simple manner, with the fuel remaining in the container and not being exposed to the environment. By transporting the fuel from the aircraft to a storage location for discharged fuel in the container, substantially all of the risks involved in transporting environmentally unfriendly and combustible fuel in an open receptacle may be avoided during said transport. At the storage location, safety facilities may be present which ensure that the fuel is safely transferred from the container to a collecting reservoir. By using the present method, substantially no fuel will find its way into the environment, and the risks involved in exposing fuel to the environment and of personnel being soiled are greatly reduced (if not completely eliminated).

The method may also include the step of emptying the container each time it has been used. Mandatory emptying of the container each time it has been used greatly reduces the likelihood of the container becoming filled with aircraft fuel to such an extent that the aircraft fuel will flow out of the container, for example via the overflow, and find its way into the environment.

Another method for receiving and discharging fuel from a fuel outlet of an aircraft according to the present invention includes, among other possible steps: (a) coupling a container to a fuel outlet of an aircraft before an engine of the aircraft is turned off; (b) draining fuel from the fuel outlet into the container initially in a substantially vertical direction and subsequently in a substantially non-vertical direction; and (c) disconnecting the container from the fuel outlet.

In a further embodiment of this method, the coupling of the container to the fuel outlet may be substantially liquid-tight.

In another further embodiment of this method, the substantially non-vertical direction may be a substantially horizontal direction.

In another further embodiment of this method, the method may also include the step of: (d) transporting the fuel in the container to a storage location for discharged fuel.

In another further embodiment of this method, the method may also include the step of: providing visible confirmation that the container is coupled to the fuel outlet of the aircraft.

The invention will be more readily understood from the following detailed description, in which reference is made to the appended drawing. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments of the invention and, together with the description, serve to explain the principles of the invention.

DETAILED DESCRIPTION

Figure 1:
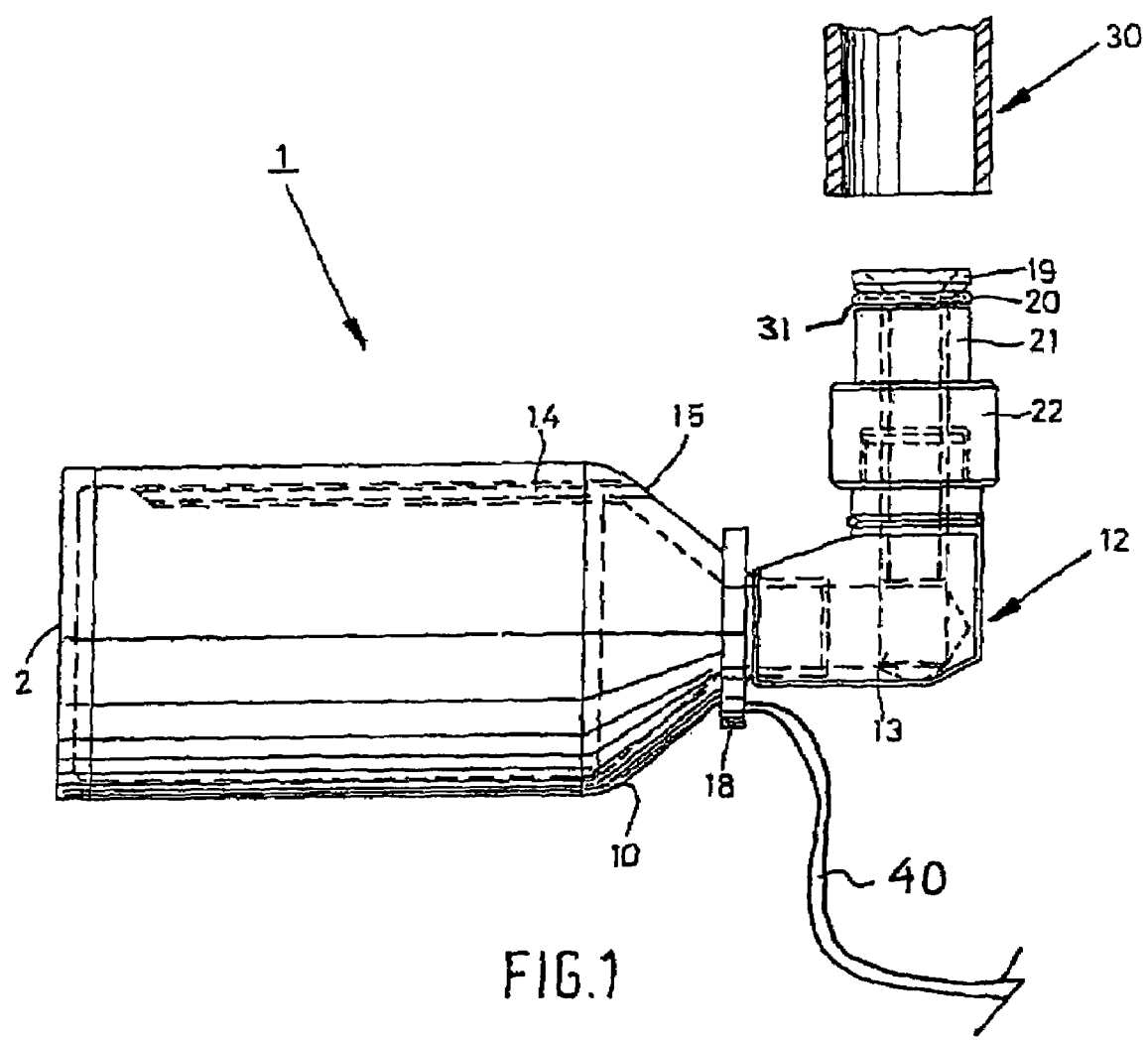
FIG. 1 is a cutaway view of an embodiment of a container according to the invention, the container being positioned under a fuel outlet of an aircraft.

Reference will now be made in detail to a presently preferred embodiment of the invention examples of which are illustrated in the accompanying drawings. An effort has been made to use the same reference numbers throughout the drawings to refer to the same or like parts.

Referring to FIG. 1, there is shown a container 1 according to the present invention and an end of a fuel outlet 30 of an aircraft. The container 1 comprises a bottle-shaped reservoir 10 with a vent tube 14, which enables communication between an interior of the reservoir and the environment via a vent hole 15. Mounted on the reservoir 10 is a compound coupling piece 12 of antistatic polyethylene for coupling the reservoir 10 to the fuel outlet 30 of the aircraft. Through the coupling piece extends a flow channel 13 for the fuel from the fuel outlet 30 to the reservoir 10. The coupling piece 12 is furthermore provided at one end thereof with an annular inlet 19 for insertion into the fuel outlet 30 of the aircraft.

Present under an inclined part 31 of the inlet 19 is a rubber ring 20, whose outer circumference is smaller than the outer circumference of the annular inlet 19 in the illustrated situation. Furthermore present on the coupling piece 12 are (a) a union 22, which is rotatably mounted on the coupling piece 12, and (b) pressure ring 21 which can be moved towards and away from the inlet 19 by turning the union 22. The rubber ring 20, the pressure ring 21, and the union 22 are configured to act as a clamp, as later described in detail.

Finally, a large indicating means 40, which may be in the form of a ribbon, may be connected to the container 1 via a ring 18. Moreover, the indicating means 40 may be substantially permanently (i.e. undetachably) connected to the container 1. When the container 1 is inserted in the fuel outlet 30, the indicating means 40 extends downwards below the aircraft, thus providing an indirect but very distinctly noticeable indication that the container 1 is coupled to the aircraft. As a result, the indicating means 40 reduces the risk of an aircraft taking off with a fuel container 1 still being coupled thereto without it being noticed.

The container 1 is connected to the fuel outlet 30 by inserting the inlet 19 into the fuel outlet 30. Subsequently, the union 22 is turned (e.g., a quarter turn), as a result of which the pressure ring 21 moves in the direction of the inlet 19 of the container 1. This movement of the pressure ring 21 causes the rubber ring 20 to slide over the inclined part 31 of the inlet 19, as a result of which the diameter of the rubber ring 20 increases and the rubber ring 20 clamps down on the inner side of the fuel outlet 30 of the aircraft. As a result, a substantially liquid-tight seal is established between the container 1 and the fuel outlet 30.

After the container 1 as previously described has been connected to the fuel outlet 30 of the aircraft, a signal may be given to the pilot of the aircraft to turn off the engine of the aircraft. When the aircraft engine is turned off, about half a liter (on average) of fuel is ejected from the aircraft via the fuel outlet 30. The fuel flows into the reservoir 10 via the coupling piece 12, as a result of which air is driven from the container through the vent tube 14 and the vent hole 15. As a result of this airflow, substantially no pressure build-up occurs in the reservoir 10.

When fuel flows fuel stops flowing out of the fuel outlet 30, the container 1 may be disconnected from the fuel outlet 30 by turning back the union 22 (e.g., a quarter turn), causing the rubber ring 20 to return to the position shown in FIG. 1 At this time, the container 1 may be removed from the fuel outlet 30 and the fuel can be moved to a storage location for fuel in the reservoir 10.

When the container 1 is transported, preferably the container 1 will be turned 90°, so that the reservoir 10 is vertically oriented, with the reservoir 10 being positioned at the bottom side thereof and the coupling piece 12 being positioned at the upper side therof. In this orientation, the container 1 can stand on a flat surface (not shown) by means of a flat underside 2 of the reservoir 10, if desired. In this situation, too, the vent hole 15 of the container 1 will be positioned at the upper side of the reservoir 10.

The preferred embodiments have been set forth herein for the purpose of illustration. This description, however, should not be deemed to be a limitation on the scope of the invention. Various modifications, adaptations, and alternatives may occur to one skilled in the art without departing from the claimed inventive concept. The true scope and spirit of the invention are indicated by the following claims.

The invention claimed is:

1. A container for receiving fuel from a fuel outlet of an aircraft, the container comprising:
   means of attachment for effecting a detachable, liquid-tight coupling with the fuel outlet; and
   a reservoir configured to store fuel,
   wherein a flowpath of fuel from the aircraft to the container in the vicinity of the fuel outlet is substantially vertical, and
   wherein the fuel flowpath at an entrance to the reservoir is substantially non-vertical.

2. The container according to claim 1, wherein said means of attachment comprises a clamp coupling.

3. The container according to claim 1, further comprising: an overflow outlet.

4. A container for receiving fuel from a fuel outlet of an aircraft, the container comprising:
   means of attachment for effecting a detachable, liquid-tight coupling with the fuel outlet; and
   an overlow outlet,
   wherein the container extends at least partially perpendicularly to the direction of outflow of the fuel from the fuel outlet of the aircraft when the container is coupled to the fuel outlet of the aircraft, and
   wherein the overflow outlet is positioned at an upper side of the container both when the container is coupled to the fuel outlet of the aircraft in a substantially horizontal orientation and when the container is not coupled to the fuel outlet and is in a substantially vertical orientation.

5. The container according to claim 1, further comprising:
   indicating means that are visible when the container is coupled to the fuel outlet of the aircraft.

6. The container according to claim 1, wherein the container is substantially made of an antistatic material.

7. The container according to claim 6, wherein the container is substantially made of a plastic material.

8. A method for receiving and discharging fuel from a fuel outlet of an aircraft, the method comprising the steps of:
   (a) coupling the container according to claim 1 to a fuel outlet of an aircraft before an engine of the aircraft is turned off;
   (b) draining fuel from the fuel outlet into the container;
   (c) disconnecting the container from the fuel outlet; and
   (d) transporting the fuel in the container to a storage location for discharged fuel.

9. The method according to claim 8, wherein the method further comprises the step of:
   (e) emptying the container.

10. A container for receiving fuel from a fuel outlet of an aircraft, the container comprising:
    a reservoir;
    a clamp configured to engage a fuel outlet of an aircraft in a liquid-tight manner; and
    a coupling piece connecting the reservoir and the clamp, wherein the coupling piece comprises a fuel flowpath,
    wherein the fuel flowpath in the vicinity of the clamp is substantially vertical, and
    wherein the fuel flowpath in the vicinity of the reservoir is substantially non-vertical.

11. The container according to claim 10, wherein the fuel flowpath in the vicinity of the reservoir is substantially horizontal when the container is coupled to the fuel outlet of the aircraft.

12. The container according to claim 10, further comprising:
    an inlet,
    wherein the clamp comprises:
      a rotatable union;
      a pressure ring configured to move, by means of a rotation of the union, substantially vertically upward and/or downward, when the container is engaged with the fuel outlet of the aircraft; and
      a rubber ring in contact with the pressure ring, wherein the rubber ring is configured to expand around the inlet, when the pressure ring is moved substantially vertically upward by the union, and wherein the rubber ring is provided below the inlet when the pressure ring is moved substantially vertically downward by the union.

13. The container according to claim 10, further comprising:
    an overflow outlet.

14. The container according to claim 13, wherein the overflow outlet is positioned at an upper side of the container both when the container is coupled to the fuel outlet of the aircraft in a substantially horizontal orientation and when the container is not coupled to the fuel outlet and is in a substantially vertical orientation.

15. The container according to claim 10, further comprising:
    an indicating means that is visible when the container is coupled to the fuel outlet of the aircraft.

16. The container according to claim 15, wherein the indicating means is a ribbon.

17. The container according to claim 10, wherein the container is substantially made of an antistatic material.

18. The container according to claim 17, wherein the container is substantially made of a plastic material.

19. A method for receiving and discharging fuel from a fuel outlet of an aircraft, the method comprising the steps of:
(a) coupling a container, which includes a reservoir, to a fuel outlet of an aircraft before an engine of the aircraft is turned off;
(b) draining fuel from the fuel outlet into the container initially in a substantially vertical direction and subsequently into the reservoir in a substantially non-vertical direction; and
(c) disconnecting the container from the fuel outlet.

20. The method according to claim 19, wherein the coupling of the container to the fuel outlet is substantially liquid-tight.

21. The method according to claim 19, wherein the substantially non-vertical direction is a substantially horizontal direction.

22. The method according to claim 19, further comprising the step of:
(d) transporting the fuel in the container to a storage location for discharged fuel.

23. The method according to claim 22, further comprising the step of:
(e) providing visible confirmation that the container is coupled to the fuel outlet of the aircraft.

24. The method according to claim 19, further comprising the step of:
(d) providing visible confirmation that the container is coupled to the fuel outlet of the aircraft.

* * * * *